United States Patent [19]

Bonner et al.

[11] Patent Number: 5,799,861
[45] Date of Patent: Sep. 1, 1998

[54] CASE FORMING MATERIALS AND COMPONENTS AND STRUCTURES THEREOF

[75] Inventors: Craig Ronald Bonner; Gregory Thomas Blomfield; Ian John McCormack; John David Riley, all of Auckland, New Zealand

[73] Assignee: Carter Holt Harvey Limited, Auckland, New Zealand

[21] Appl. No.: 505,265

[22] PCT Filed: Feb. 4, 1994

[86] PCT No.: PCT/NZ94/00006

§ 371 Date: Sep. 28, 1995

§ 102(e) Date: Sep. 28, 1995

[87] PCT Pub. No.: WO94/19538

PCT Pub. Date: Sep. 1, 1994

[30] Foreign Application Priority Data

Feb. 17, 1993 [NZ] New Zealand ............... 245923

[51] Int. Cl.⁶ ..................... B65D 5/32; B65D 5/42
[52] U.S. Cl. ............. 229/23 R; 220/443; 229/198.1; 229/939; 229/940
[58] Field of Search ................. 229/23 R, 198.1, 229/939, 940; 264/286; 428/182; 220/443

[56] References Cited

U.S. PATENT DOCUMENTS

| | | | |
|---|---|---|---|
| 1,459,017 | 6/1923 | Dean | 229/940 |
| 2,722,366 | 11/1955 | Carlson | 229/198.1 |
| 3,922,129 | 11/1975 | McDonald | 264/286 |
| 4,140,564 | 2/1979 | Schrader | 264/286 |
| 4,601,407 | 7/1986 | Gillard | 229/939 |
| 5,048,689 | 9/1991 | McFarland | 229/939 |

FOREIGN PATENT DOCUMENTS

| | | |
|---|---|---|
| 29153/71 | 11/1972 | Australia. |
| 14900/76 | 12/1977 | Australia. |
| 36164/78 | 11/1979 | Australia. |
| 1 297 767 | 3/1992 | Canada. |
| 986 582 | 3/1965 | European Pat. Off.. |
| 2 166 083 | 4/1986 | European Pat. Off.. |
| 2 252 073 | 7/1992 | European Pat. Off.. |
| 2 258 189 | 2/1993 | European Pat. Off.. |
| 2 666 356 | 3/1993 | European Pat. Off.. |
| 93/22138 | 11/1993 | WIPO. |

OTHER PUBLICATIONS

The Wiley Encyclopedia of Packaging Technology, John Wiley and Sons, pp. 66–68, 1986.

*Primary Examiner*—Gary E. Elkins
*Attorney, Agent, or Firm*—Jacobson, Price, Holman & Stern, PLLC

[57] ABSTRACT

A case forming panel and case structures incorporating the case forming panel, the material of which being a laminate of internal and exterior liners on a flute providing medium of corrugated board having a flute pitch in depth greater than that of "A" flute, the flutes to extend in use substantially vertically, and preferably having a flute pitch of about 54 mm, a flute depth of about 27 mm, and a take up of about 1.54:1.

24 Claims, 10 Drawing Sheets

CASE FORMING MATERIALS AND COMPONENTS AND STRUCTURES THEREOF

The present invention relates to improvements in and/or relating to case forming materials and components and structures thereof, including sub assemblies and total case defining assemblies.

Many forms of material including those based on cellulosic fibres, such as paper board (fluted or otherwise), are known from which cases, cartons or the like can be formed. The present invention relates to an improved panel forming assembly suitable for the forming of cases that has certain structural advantages over existing materials.

It is therefore an object of the present invention to provide a panel forming assembly, panels formed of that kind, components for a case using such panels including structural features (such as corners, tops and/or bases) thereof which will provide the public with a useful choice.

In a first aspect the present invention consists in a panel forming assembly comprising
 a flute providing medium,
 a liner for one side of said medium, and
 a liner for the other side of said flute providing medium, wherein said flute providing medium is a corrugated board having a flute pitch and depth greater than that of "A" flute and preferably with a take up of about 1.54:1.

In a further aspect the present invention consists in a panel forming assembly comprising
 a flute providing medium,
 a liner for one side of said medium, and
 a liner for the other side of said flute providing medium, wherein said flute providing medium is of a corrugated solid fibre board that has been heat formed to provide a flute pitch and depth greater than that of "A" flute.

In a further aspect the present invention consists in a panel forming assembly comprising
 a flute providing medium,
 a liner for one side of said medium, and
 a liner for the other side of said flute providing medium, wherein said flute medium is formed of kraft liners sandwiching another or a similar source of cellulosic fibres and which has been corrugated in the presence of moisture, heat and pressure to provide structural integrity as well as forming the flutes thereof.

In a further aspect the present invention consists in a panel forming assembly comprising
 a flute providing medium,
 a liner for one side of said medium, and
 a liner for the other side of said flute providing medium, wherein said flute medium is lined on one or both sides by a solid fibre board and/or a single, double or triple flute paper board.

Preferably the flute directions of any liner and/or the flute medium are in one of the arrays hereinafter set forth in Table I.

In a further aspect the present invention consists in a panel forming assembly comprising
 a flute providing medium,
 a liner for one side of said medium, and
 a liner for the other side of said flute providing medium, wherein the flute medium is a corrugated board having a flute pitch of about 54 mm, a flute depth of about 27 mm and a take up of about 1.54:1.

Preferably said flute medium is of a cellulosic material such as a corrugated laminate of cellulosic fibre such as, for example, recycled paper as a core and kraft liners sandwiching the recycled paper fibres.

Preferably one or both of said liners of said flute medium is a solid fibre board and/or one or both of the liners of said flute medium is a fluted paper board such as, for example, a single, double, or triple fluted board.

Preferably the panel providing assembly is bonded together using an appropriate adhesive such as, for example, a PVA adhesive.

In a further aspect the present invention consists in a panel or panel forming material as previously set forth where one or both liners are not co-extensive with the flute providing medium and thereby defining a flap or flaps that is or are adapted (a) for lapping or lap joining with another structure or a like structure, (b) for providing a case forming connection to another structure, (c) for providing a case forming connection to a base or to provide a base thereof, and/or (d) upon folding, for bracing (e.g. as a beam) the top and/or bottom of a wall defined by the panel.

In a further aspect the present invention consists in a corner construction between walls defined by a panel where each panel comprises a laminated assembly comprising
 a flute providing medium,
 a liner for one side of said medium, and
 a liner for the other side of said flute providing medium, and wherein said flute providing medium is a corrugated board having a flute pitch in depth greater than that of "A",
 the corner assembly being defined by the liners on the inner side of the corner having been cut and/or scored [or an edge or edges of its liner appropriately positioned—hereafter "cut or scored"] but with no such corresponding cut or scoring to the outside lining, such cutting or scoring being over the channel of a flute and such flute being capable upon bending to provide said corner of receiving, lying against each other, regions of the inner liner of each of the two panels proximate to said cut or scoring within the said channel, which channel is compressed but leaving substantially all of the other channels of the flute providing medium adjacent the corner of each panel substantially unchanged.

In other forms the corner assembly may involve a lapping of part of the liner of one panel over part of the outer liner of the other panel where a corner is formed between two separate panel regions.

In still a further aspect a bridging strip may be positioned over the exterior regions of the outer liners at a corner region, said corner otherwise being substantially as hereinbefore described.

The present invention also comprises a corner construction between walls each defined by a panel assembly where each panel assembly comprises a laminated assembly comprising
 a flute providing medium
 a liner for one side of said medium, and
 a liner for the other side of said flute providing medium, and wherein said flute providing medium is a corrugated board having a flute pitch in depth greater than that of "A" flute,
 the corner assembly being defined by the separate assemblies being brought into a butting relationship and having part of a liner of one panel lapped over part of the liner of the other.

In yet a further aspect the present invention consists in a case having wall panels provided by a lamination of a flute providing medium,
 a liner for one side of said medium, and
 a liner for the other side of said flute providing medium, wherein said flute providing medium is a corrugated board having a flute pitch and depth greater than that of "A" flute, the corrugated board having the flutes thereof extending substantially vertically and being unbroken at least between the corners of the walls of the case or being lapped to provide no breaks between at least the corners of said case.

Preferably said cases are formed using panel forming assemblies as defined any of the ways previously set out.

Preferably the liners are as hereinbefore described and are in any of the combinations set out hereinafter in Table I.

In a further aspect the present invention consists in a case where the walls thereof are formed from a panel forming assembly of any of the kinds previously set forth but the base thereof (preferably to be supported in use on a pallet) does not include said flute providing medium and may not include as any part thereof a material integral with a panel or connect thereto of greater thickness than the outer liner.

Preferably said case includes a capping member which overcaps and connects to the outer liner of each panel forming assembly.

In an other form of the present invention preferably the case, with its preferred rectangular or square form when viewed in plan, includes as an extension or as a lapped connection from the outside liners flap members which provide at least part of a closure for the contained shape, thereby providing some structural bracing for the panel. In another form such a flap member can be instead adhered to the panel over its top edge and to the inner liner.

Preferably each wall includes such a flap member and such flap members are able to be inter-engaged to provide some bracing against movement of each panel from its vertical condition under loading.

Preferably the base providing extensions or connections to the outer liner of at least some of the panel sections provides a similar support.

The present invention consists in any method of manufacturing a panel or a case which results in a panel or case as previously set forth.

The invention also comprises a corner construction between walls each defined by a panel assembly where each panel assembly comprises a laminated assembly comprising
    a flute providing medium
    a liner for one side of said medium, and
    a liner for the other side of said flute providing medium,
and wherein said flute providing medium is a corrugated board having a flute pitch in depth greater than that of "A" flute,
    the corner assembly having a bridging strip of member positioned over approximate exterior regions of the outer liners at the corner region.

In still a further aspect the invention consists in a corner construction between walls each defined by a panel assembly where each panel assembly comprises a laminated assembly comprising
    a flute providing medium,
    a liner for one side of said medium, and
    a liner for the other side of said flute providing medium,
and wherein said flute providing medium is a corrugated board having flute pitch in depth greater than that of "A" flute,
    the corner assembly comprising the panels held in juxtaposition by both interior and exteriorially affixed bridging strips or elements.

Preferably the case has each wall including a flat member and such flat members are able to be inter-engaged to provide some bracing against movement of each panel assembly from its vertical condition under loading. Preferably extensions or connections to the outer liner of at least some of the panel sections extend as base flaps in the plane of the surface of a supporting pallet (if any).

The present invention also consists in a method of carrying goods which involves the use of panels and/or cases in accordance with the present invention.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

Preferred forms of the present invention will now be described with reference to the accompanying drawings in which;

FIG. 2 shows typical components of a case with FIG. 2A being of an integral member capable of providing two wall panels in a case which are to be (with respect to each other) at right angles, there being a flap provided top and bottom as well as at one end by the outer liner (for providing bracing top and bottom and for lapping to connect to a like structure so as to define a substantially square case when viewed in plan which is braced top and bottom by interconnected or at least overlapping top and bottom flaps).

FIG. 2B (not to scale) shows the flute providing medium prior to flute forming.

In the preferred form of the invention the preferred panel forming material is a lamination of three layers, namely an outer liner A, a flute providing medium C which is preferably corrugated board (but could be other flute providing means) and an inner liner B.

Preferably the outer and inner liners A and B are processed through a corrugator to provide a single, double or triple flute board with the paper weight/grade varying according to the application to which the panels are to be directed. In some alternatives one or both of liners A and B can be manufactured in solid fibreboard.

The flute providing medium C is preferably manufactured from solid fibreboard.

Preferably this fibreboard is laminated from paper having an outer kraft liner, a generally (preferably re-cycled) paper filler and a kraft inner liner. Various paper grades and number of laminations can vary according to application. To provide an integrity for this flute providing medium the sheets are preferably pre-moistened and the flute forming grid is heated to provide the flutes and the required structural integrity possibly through some reactivation of the laminating resins (if any) and/or lignin.

In the preferred form of the present invention the flute providing medium has a flute pitch of about 54 mm, and flute depth of 27 mm and a take up of about 1.54:1. The specified flute pitch and depth is greater than that of conventional "A" flute.

Figure 1:
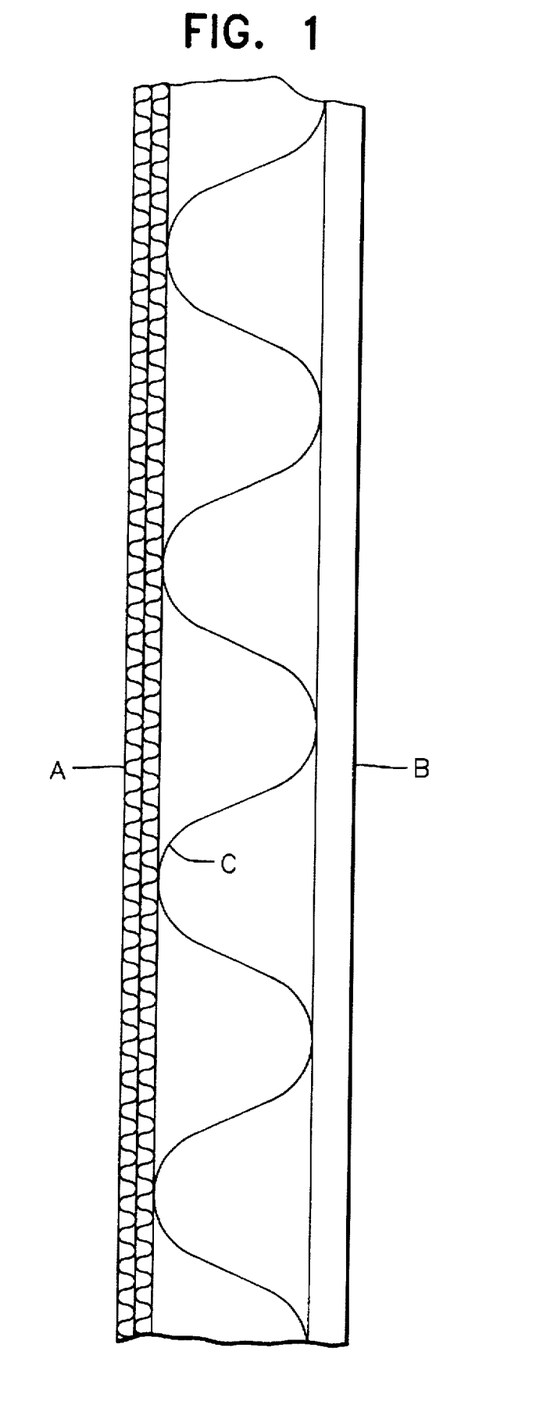
FIG. 1 is a preferred form of the present invention having a corrugated flute providing central medium, the flutes of which in a wall panel of a case are to extend vertically, and which is sandwiched by liners which in the form of FIG. 1 are preferably both of a double flute board, i.e. two flute providing corrugated paper mediums on either side of a separating sheet and themselves each lined on both sides by another sheet.

In relation to FIG. 1 the flutes are provided by the corrugated board formed either continuously or by non-continuous sheet forming process. The structure is such that preferably the flutes are to run vertically. Adhesive (preferably PVA) is applied to bond the inner liner B to the flute providing medium C. Likewise the outer liner C is adhered to the flute providing medium C.

The preferred material as depicted in FIG. 1 for the liners A and B is preferably double flute board. Irrespective however of whether or not single, double or triple flute board is used (if indeed a fluted board is used at all), there are a variety of different orientations of the various flutes that can be utilised and Table I hereafter shows with respect to the flute providing medium "flute" how the inners and outers can have their single, double, or triple flute aligned in a number of different directions with respect thereto.

TABLE I

| Inner | Vertical | Horizontal | Vertical | Horizontal | Vertical | Horizontal |
|---|---|---|---|---|---|---|
| Flute | Vertical | Vertical | Vertical | Horizontal | Horizontal | Horizontal |
| Outer | Vertical | Vertical | Horizontal | Horizontal | Horizontal | Vertical |

Figure 2A:
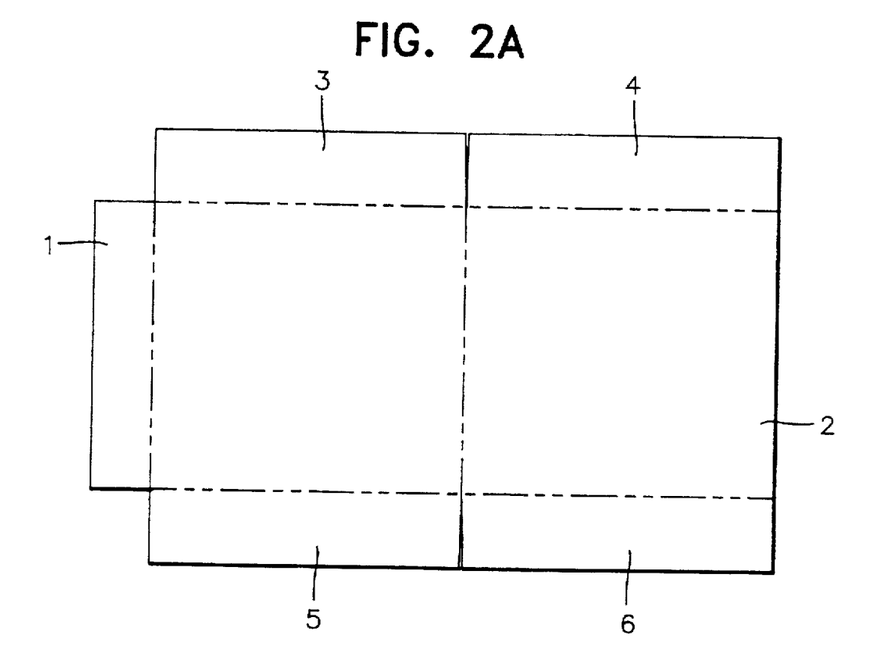
FIG. 2A, FIGS. 2B and 2C, show different configurations of the laminations of a single panel of a form which can mate with a like panel and lap join thereto as well as provide top and bottom strengthening flaps.

FIG. 2A shows a preferred configuration for the outer liner. The flute providing medium is shown unfluted and not to scale in FIG. 2B. The inner are liners two of the sheets shown not to scale in FIG. 3A There is provided a flap 1 which can be used to lap over the region 2 of a like component to define in plan a square case. There can also be seen top flaps 3 and 4 and bottom flaps 5 and 6 which preferably act as a strengthening "beam" or the like when folded inwardly in a structure irrespective of whether or not the same are in some way adhered, stapled or not. In the closed condition such an arrangement can be seen in the construction of FIG. 4 where preferably such flaps are adhered closed. Similarly with the form of FIG. 5. Alternatively the flaps can be stapled to each other or taped to each other to enhance the strength of the resulting structure.

Figure 3:
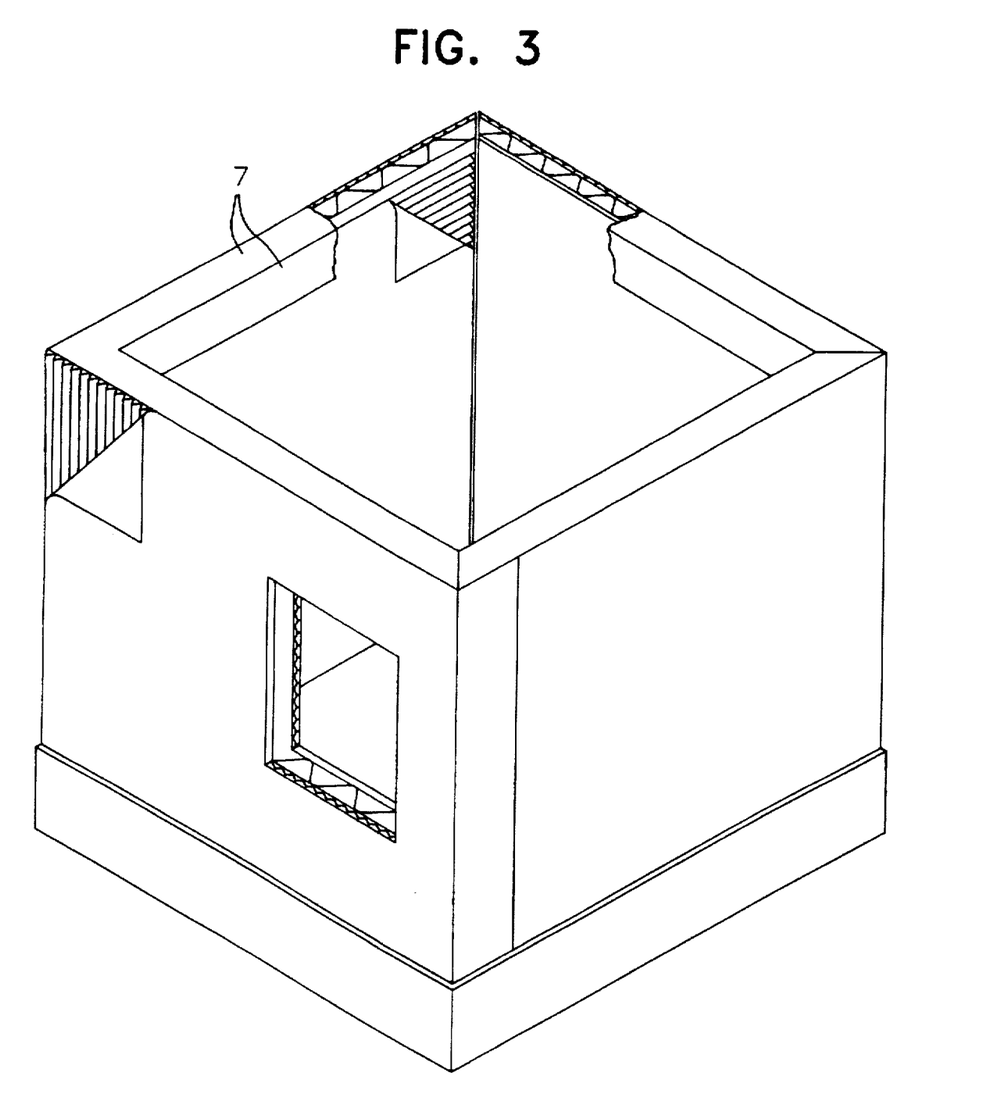
FIG. 3 is a perspective view of a case formed by a variation of the arrangement as shown in FIG. 1 and shown by means of pull aways and cut aways, the structure of a wall panel and how if desired the flute running directions of the preferred liners need not both or all be aligned with the preferred vertical extending flute direction of the flute providing medium.

FIG. 3 shows the cap and sleeve style with the flute orientation options also depicted. Here the outer flaps fold inward to cover the exposed edge of the flute providing medium and provide strength, i.e. the top flaps have been bevelled to allow them to adhere over and to the inner liner to provide enhanced strength and to provide some measure of moisture proofing for the flute defining medium and the liners. This over reaching flap is designated by the reference numeral 7.

Figure 4:
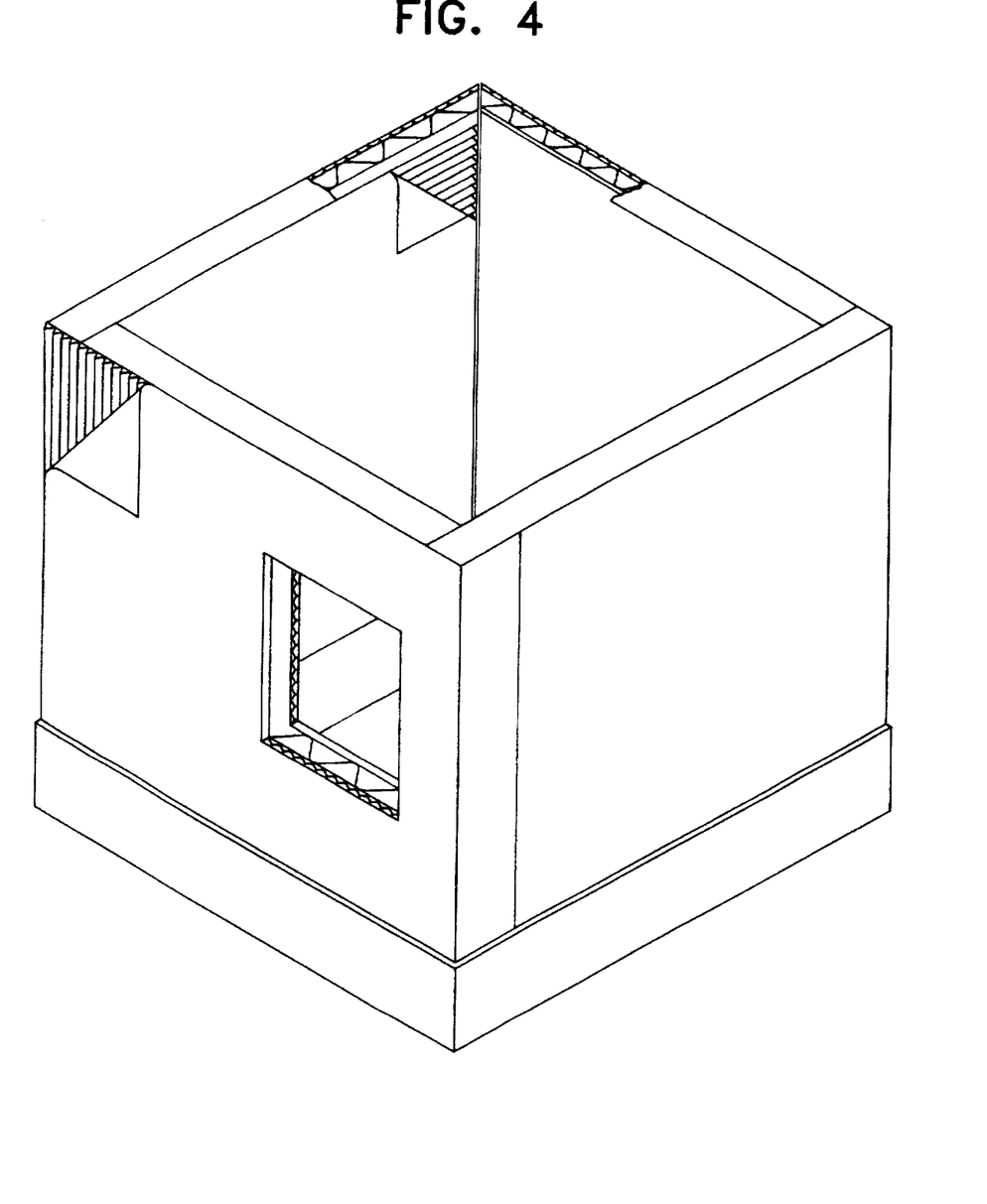
FIG. 4 is a similar view to that of FIG. 3 showing a different top capping bracing member partly broken away to one side to show better the structure.

FIG. 4 shows a short top flap and a bottom. Both flaps provide beam strength and can be used in conjunction with base forming inserts (attached or not) on a pallet as well as with caps which are either over caps or indexing caps.

Figure 5:
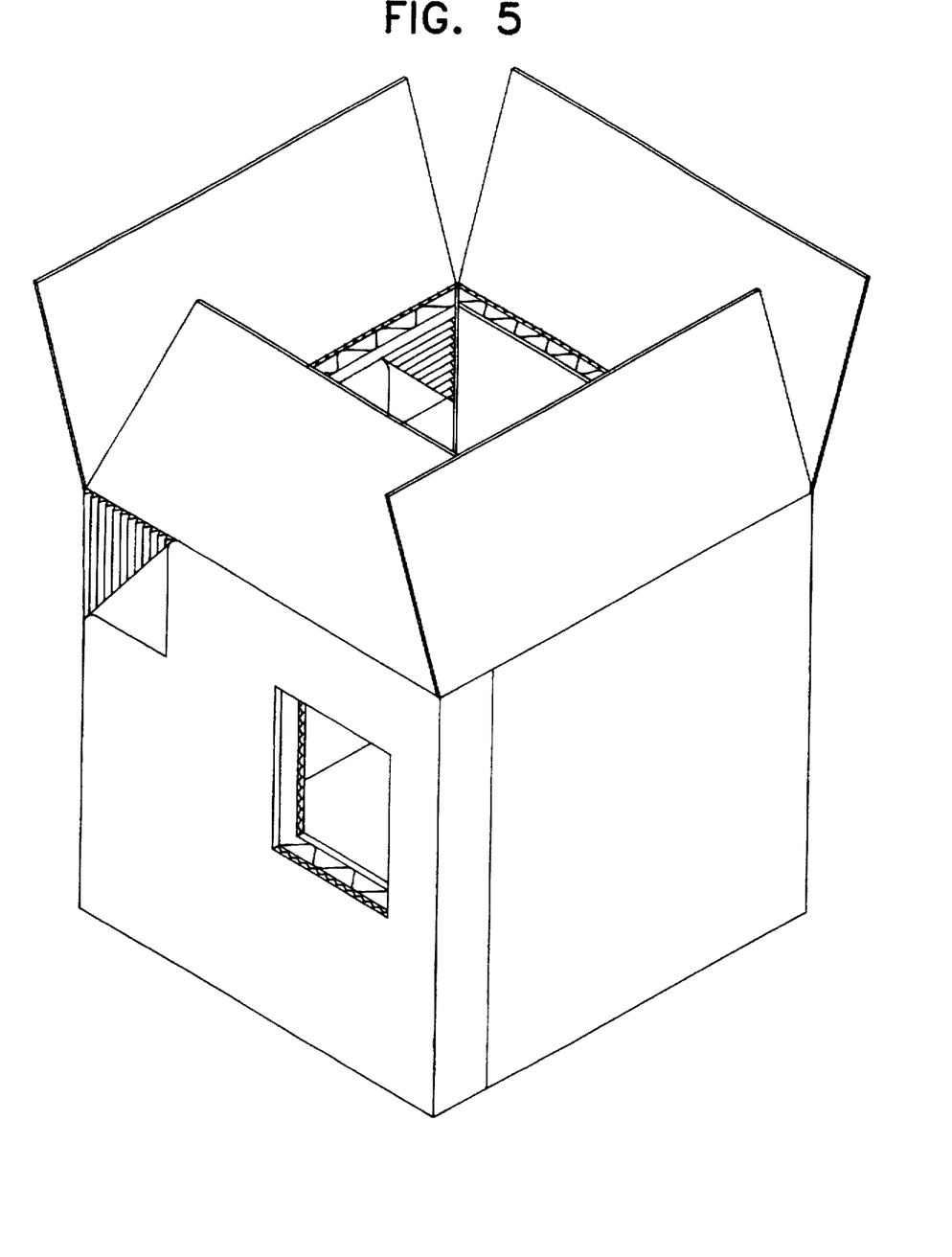
FIG. 5 is yet a further variation of the arrangements of FIGS. 3 and 4.

FIG. 5 shows a bin style with a much fuller flap option. In such a style the base can be of a similar dimension or can be of the smaller flap form as depicted in FIG. 4.

Persons skilled in the art will appreciate that within the scope of the present invention any of the various combinations anticipated can be utilised with each other.

Figure 6:
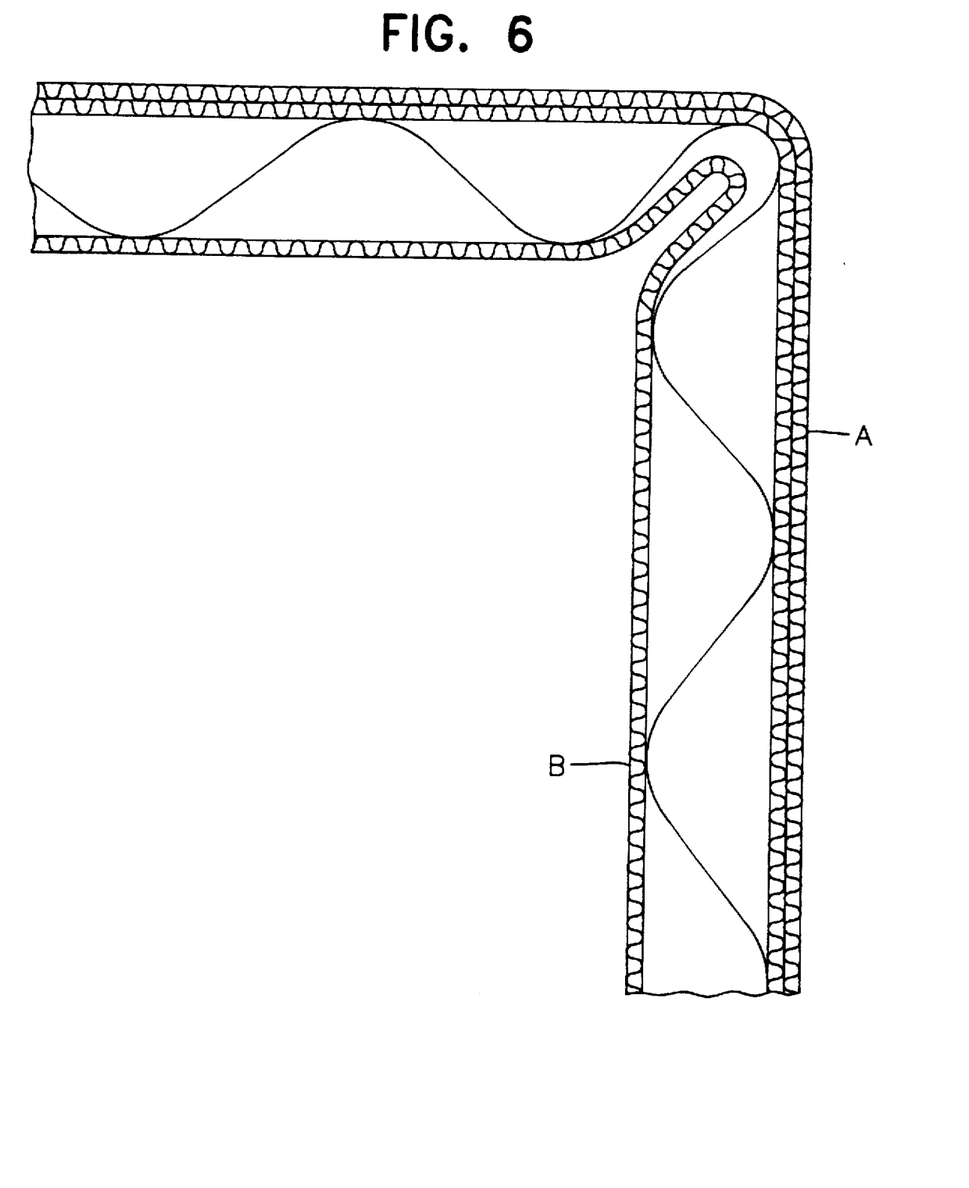
FIG. 6 is a plan view of a corner such as that shown in FIG. 4 where the panel forming material is as shown in FIG. 1.

FIG. 6 shows the form of a preferred corner where a cut or scoring of an inner (or edges of two parts of an inner liner) over a channel of the flute defining medium allows regions of the inner B to be positioned along side each other within a compressed flute, thus meaning that over the panel expanse the flute providing medium is largely undistorted. In such an arrangement where there is no lapping on the outside the outer liner A is continuous. As appreciated with the arrangement of FIG. 2A in any one case there will be two opposed corners as depicted in FIG. 6 but the other corners will be a variation thereof where the lapping member 1 engages on a region 2 of a like component and there is a break in the continuity at those corners of the flute providing medium.

In preferred forms however preferably the flute providing medium is continued from one component to another so that the same can be adhesively lapped one to an other during assembly. In such a construction, preferably the inner B is kept clear of such overlapping regions.

It can be seen however that the material and constructions provide for the butting of the inners when glued to the outer to create a gap and when folded the outer vertical edges form an entrapped mitre shaped corner.

Figure 2B:
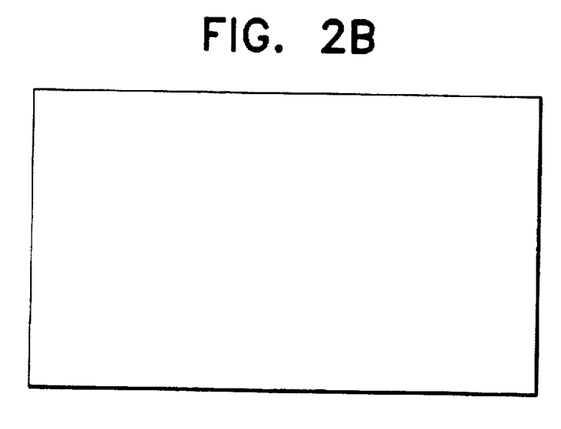
Figure 2C:
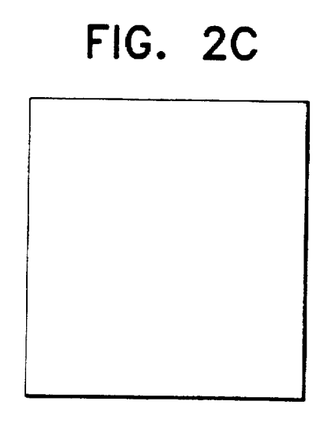

In a form as depicted in FIGS. 1, 6 and any of 3 through 5 the configuration of the outer A (preferably a "single faced sheet") is as depicted in FIG. 2A, with the core providing medium having the dimensions and configurations as shown in FIG. 2B while the inner liner B comprises two "single faced sheets" of the configuration of FIG. 2C.

Figure 7:
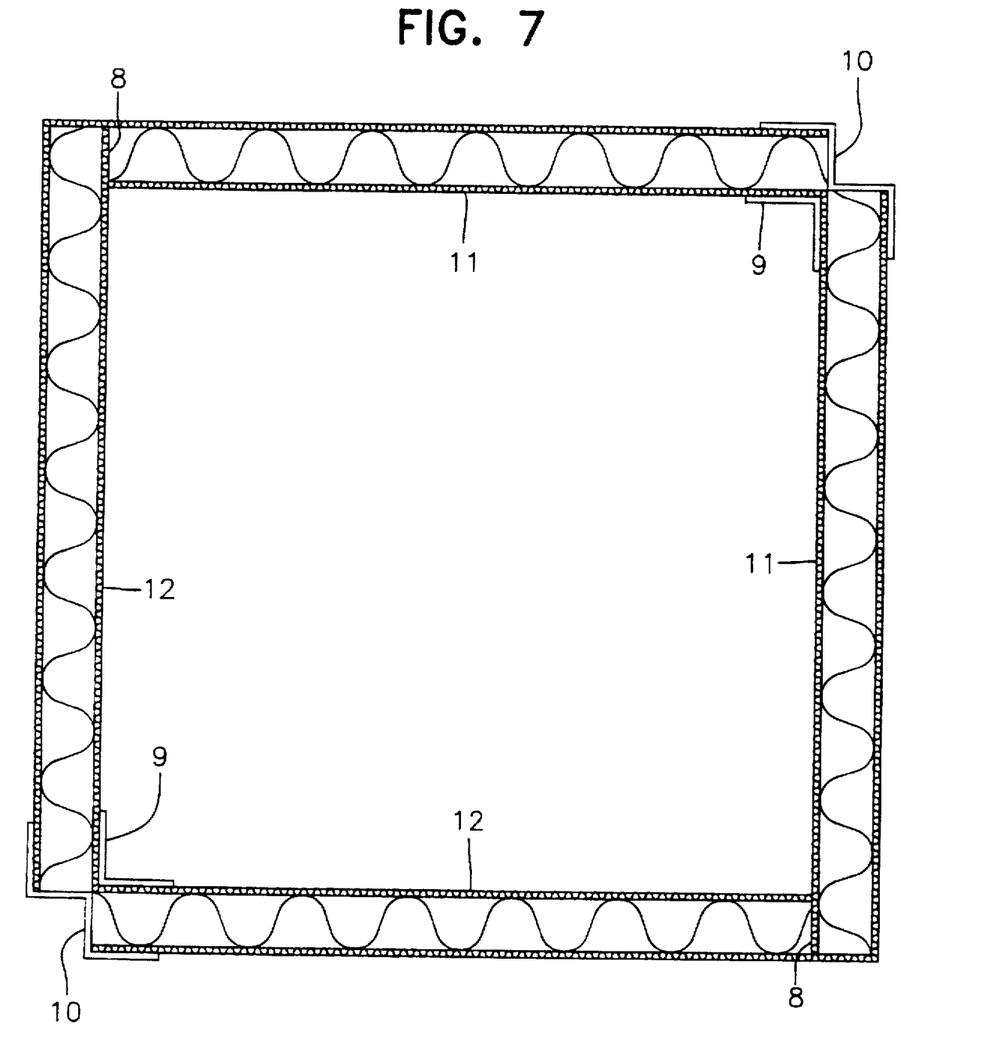
FIG. 7 is a plan view of a case structure having at least two butting corners affixed one to the other by both internal and external strips.
Figure 8:
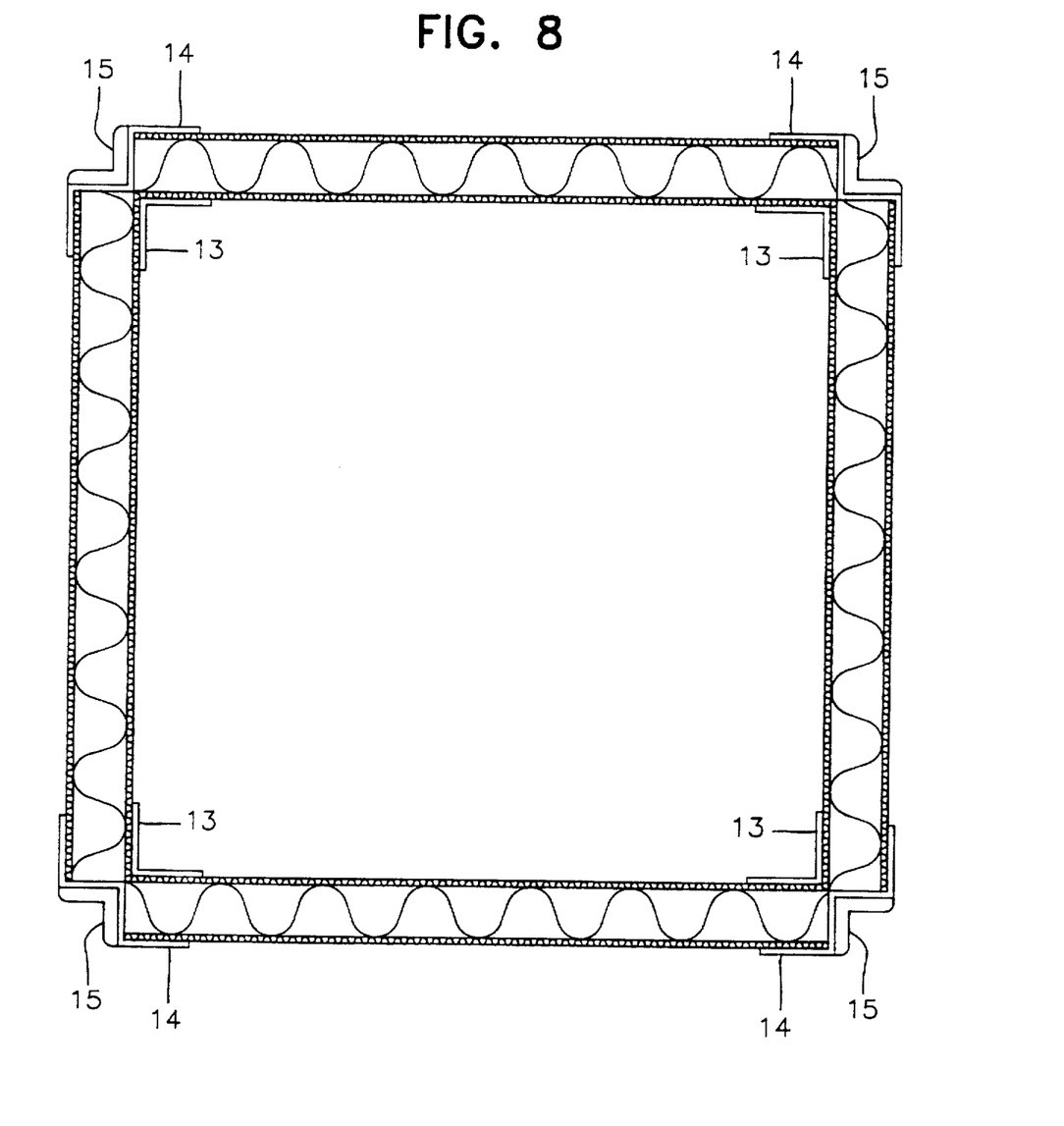
FIG. 8 is a similar view to that of FIG. 7, but showing an in fill member positioned on the exterior strips.
Figure 9:
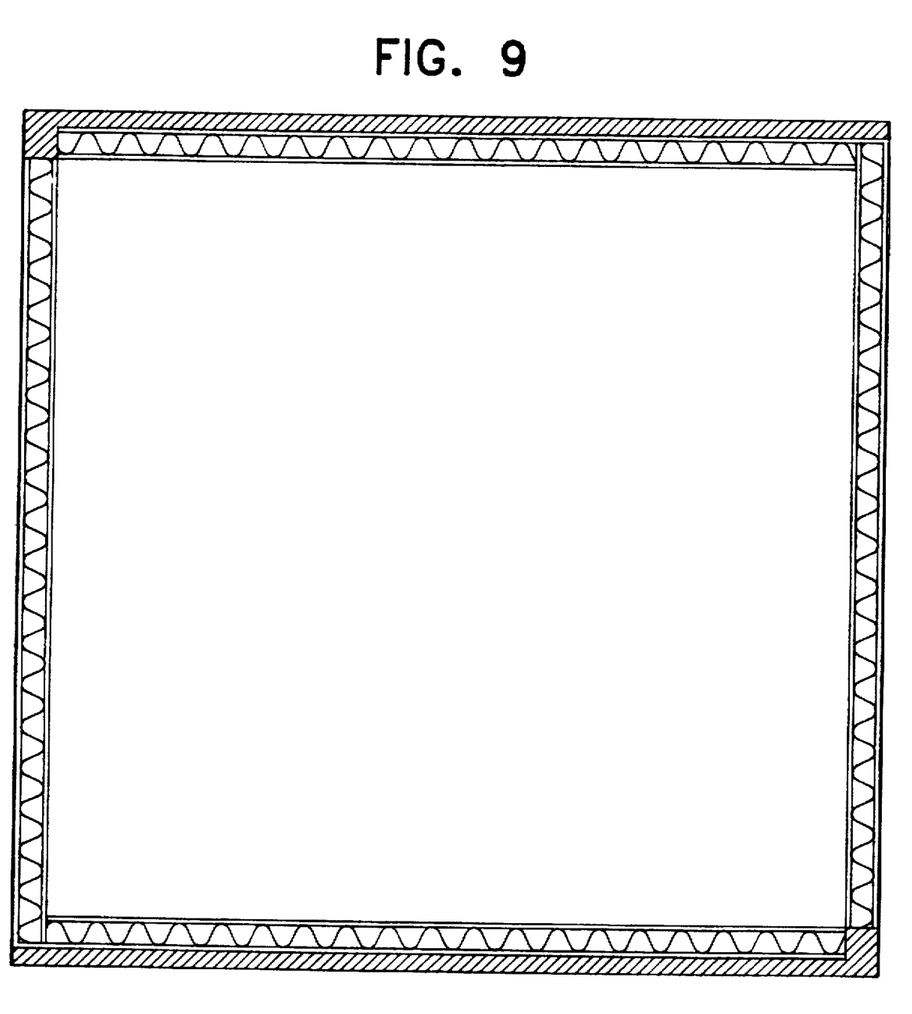
FIG. 9 shows from above a plan view of a preferred form of case shown on a pallet base (the pallet base being shaded) with the bulk bin being to scale in relation to a bulk bin having outside dimensions of 1200 by 1000 mm, the flute sizes of this particular embodiment being shown to scale relative thereto.

Additional Bulk Bin Corner Design Features are shown in FIGS. 7 and 8.

That of FIG. 7 has two butting corners 8 with the opposite two corners having a separate solid fibre internal hinge 9 glued in position and an external end cap 10 glued in position. The end cap can be in corrugated or solid fibre material or adhesive taped. The design collapses flat for delivery 4 to 4, 5 to 5.

That of FIG. 8 has all four corners with an internal solid fibre hinge 13 glued in position. Each of the four corners has an external cap 14 of corrugated or solid fibre material, or adhesive tape. The bin can be collapsed flat for delivery through either diagonal.

The design allows for additional corner support 15 to be used without increasing or detracting from the bin external or internal dimensions.

Figure 10:
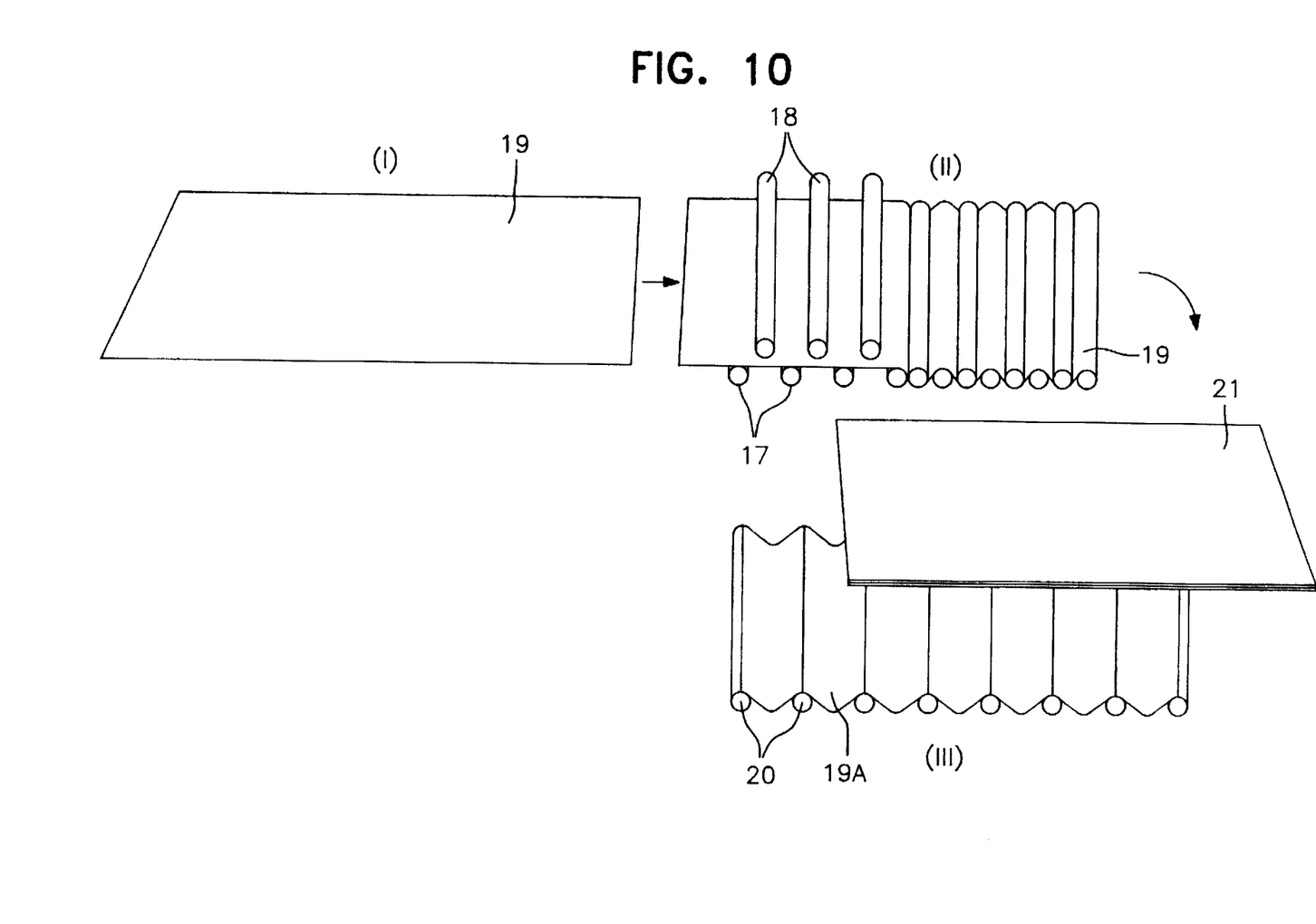
FIG. 10 is a diagrammatic view of a process whereby a feed of material (I) passes between two roller series (II) and thereafter is subject to a first of two laminating procedures.

Solid fibre paperboard in sheet form of approximate size 1200×1000 are fed individually into a forming machine as shown in the first stage (I) in FIG. 10.

The machine consists of a bottom heated grid 17 and pneumatically operated heated top forming bars 18. These operate sequentially to form the solid fibre sheet 19 into a fluted form. The take-up being affected by the pitch diameter and depth of flute. This is predetermined and fixed.

The temperature of the heated grid and forming bars is set to achieve a surface temperature of 65° C. to plasticize the laminating adhesive of the sheet being formed in the shortest possible time.

The fluted sheet is held in the grid for a short curing time.

Pre-formed flute sheets 19A are transferred onto a fluting grid 20 with a corresponding flute pitch.

PVA adhesive is applied to the flute tips and a flat sheet of nominated paperboard material 21 is placed on the flute tips. Pressure is applied (eg by press, rollers or other means) until a satisfactory bond is achieved. This forms the single face sheet.

To complete the structure, adhesive is applied to the exposed flute tip. A sheet of nominated paperboard material is placed on the flute tips and is in compression until cured.

The design of the second sheet or outer is dependant on the end use.

Persons skilled in the art will appreciate how only a few of the various combinations within the present invention have been specifically mentioned. Nevertheless the structures of the present invention when compared with conventional board combinations can provide a 28% reduction in paper usage (with corresponding reduction in cost) for a 40% increase in strength.

What we claim is:

1. A panel forming assembly comprising a flute providing medium having two sides, a liner for one side of said flute providing medium, and a liner for the other side of said flute providing medium, wherein said flute providing medium is a corrugated board having a flute pitch and depth greater than that of "A" flute.

2. The assembly of claim 1 with a take up of about 1.54:1.

3. The assembly of claim 1 wherein the flute directions of at least one of the liners and the flute providing medium is in one array set forth in the following table:

| Inner | Vertical | Horizontal | Vertical | Horizontal | Vertical | Horizontal |
|---|---|---|---|---|---|---|
| Flute | Vertical | Vertical | Vertical | Horizontal | Horizontal | Horizontal |
| Outer | Vertical | Vertical | Horizontal | Horizontal | Horizontal | Vertical |

4. The assembly of claim 1 wherein said flute providing medium is a corrugated laminate of cellulosic fibre.

5. The assembly of claim 1 wherein at least one of said liners of said flute providing medium is one of a solid fibre board and a fluted paper board.

6. The assembly of claim 1 wherein the panel forming assembly is bonded together using an adhesive.

7. The panel forming assembly of claim 1 wherein at least one of the liners are not co-extensive with the flute providing medium and thereby defining at least one flap that is adapted to at least one of (a) for at least one of lapping and lap joining with another structure, (b) for providing a case forming connection to another structure, (c) for providing a case forming connection to a base, (d) for providing a base, and (e) upon folding, for bracing at least one of the top and bottom of a wall defined by the panel.

8. The case where the walls thereof are formed from the panel forming assembly of claim 1 but the base thereof does not include said flute providing medium.

9. The case of claim 8, wherein the base thereof does not include a material integral with a panel or connect thereto of greater thickness than the outer liner.

10. A panel forming assembly comprising a flute providing medium having two sides, a liner for one side of said medium, and a liner for the other side of said flute providing medium, wherein said flute providing medium is of a corrugated solid fibre board that has been heat formed to provide a flute pitch and depth greater than that of "A" flute.

11. A panel forming assembly comprising a flute providing medium having two sides, said flute providing medium being a corrugated board having a flute pitch and depth greater than that of "A" flute, a liner for one side of said medium, and a liner for the other side of said flute providing medium, wherein said flute providing medium is formed of kraft liners sandwiching a source cellulosic fibres having been corrugated in the presence of moisture, heat and pressure to provide structural integrity as well as forming flutes of said flute providing medium thereof.

12. A panel forming assembly comprising a flute providing medium having two sides, said flute providing medium being a corrugated board having a flute pitch and depth greater than that of "A" flute, a liner for one side of said medium, and a liner for the other side of said flute providing medium, wherein said flute providing medium is lined on at least one side by at least one of a solid fibre board, a single flute paper board, a double flute paper board and a triple flute paper board.

13. A panel forming assembly comprising a flute providing medium having two sides, a liner for one side of said medium, and a liner for the other side of said flute providing medium, wherein the flute providing medium is a corrugated board having a flute pitch of about 54 mm, a flute depth of about 27 mm and a take up of about 1.54:1.

14. A corner construction between walls each defined by a panel assembly where each panel assembly comprises a laminated assembly comprising a flute providing medium having two sides, a liner for an inner side of said medium, and a liner for an outer side of said flute providing medium, and wherein said flute providing medium is a corrugated board having a flute pitch in depth greater than that of "A" flute, a corner assembly being defined by liners on an inner side of the corner assembly having been at least one of cut and scored but without a corresponding said at least one of cut and scored to the liner on the outer side, said at least one of cut and scored being over the flute and said flute being capable upon bending to provide said corner of receiving, lying against each other, regions of an inner liner of each of two panels proximate to said at least one of cut and scored within a channel, the channel being compressed but leaving substantially all of the other flutes of the flute providing medium adjacent a corner of each of the panels substantially unchanged.

15. A corner construction between walls each defined by a panel assembly where each panel assembly comprises a laminated assembly comprising a flute providing medium having two sides, a liner for one side of said medium, and a liner for the other side of said flute providing medium, and wherein said flute providing medium is a corrugated board having a flute pitch in depth greater than that of "A" flute, a corner assembly being defined by separate assemblies being brought into a butting relationship and having part of a liner of one panel lapped over part of a liner of another panel.

16. A case having wall panels provided by a lamination of
   a flute providing medium having two sides,
   a liner for one side of said medium, and
   a liner for the other side of said flute providing medium, and
   wherein said flute providing medium is a corrugated board having a flute pitch and depth greater than that of "A" flute, the corrugated board having the flutes thereof extending substantially vertically and at least one of being unbroken at least between corners of walls of the case and being lapped to provide no breaks between at least the corners of said case.

17. The case of claim 16, wherein the liners are in any of the combinations set out in the following table:

| Inner | Vertical | Horizontal | Vertical | Horizontal | Vertical | Horizontal |
|---|---|---|---|---|---|---|
| Flute | Vertical | Vertical | Vertical | Horizontal | Horizontal | Horizontal |
| Outer | Vertical | Vertical | Horizontal | Horizontal | Horizontal | Vertical |

18. The case of claim 16 which includes a capping member which overcaps and connects to the outer liner of each panel forming assembly.

19. The case as claimed in claim 16, wherein each wall includes a flap member and the flap members are able to be inter-engaged to provide some bracing against movement of each panel assembly from its vertical condition under loading.

20. The case of claim 19 wherein extensions or connections to the outer liner of at least some of the panel sections extend as base flaps in a plane of a surface of a supporting pallet.

21. A corner construction between walls each defined by a panel assembly where each panel assembly comprises a laminated assembly comprising
   a flute providing medium having two sides,
   a liner for one side of said medium, and
   a liner for the other side of said flute providing medium, and wherein said flute providing medium is a corrugated board having a flute pitch in depth greater than that of "A" flute,
   a corner assembly having a bridging strip or member positioned over approximate exterior regions of outer liners at a corner region.

22. A corner construction between walls each defined by a panel assembly where each panel assembly comprises a laminated assembly comprising
   a flute providing medium having two sides,
   a liner for one side of said medium, and
   a liner for the other side of said flute providing medium, and wherein said flute providing medium is a corrugated board having flute pitch in depth greater than that of "A" flute,
   a corner assembly comprising the panels held in juxtaposition by both interior and exteriorally affixed bridging strips or elements.

23. The corner construction as claimed in claim 22 wherein the bridging strip or element affixed to the interior liners is substantially at least one of L-shaped and V-shaped and the bridging strip or element of the exterior affixed adhesively t the exterior liners is substantially M shaped but with angles of right angles so that the interior arms of said M shape each provide a right angle closure of the end of each panel.

24. The corner construction as claimed in claim 23 wherein a filling member is positioned against each of said interior arms of said M shape.

* * * * *